US006674867B2

United States Patent
Basseas

(10) Patent No.: US 6,674,867 B2
(45) Date of Patent: Jan. 6, 2004

(54) NEUROFUZZY BASED DEVICE FOR PROGRAMMABLE HEARING AIDS

(75) Inventor: Stavros Photios Basseas, Park Ridge, IL (US)

(73) Assignee: Belltone Electronics Corporation, Chicago, IL (US)

( * ) Notice: Subject to any disclaimer, the term of this patent is extended or adjusted under 35 U.S.C. 154(b) by 0 days.

(21) Appl. No.: 09/170,671

(22) Filed: Oct. 13, 1998

(65) Prior Publication Data

US 2003/0123685 A1 Jul. 3, 2003

Related U.S. Application Data

(60) Provisional application No. 60/062,354, filed on Oct. 15, 1997.

(51) Int. Cl.$^7$ .............................................. H04R 25/00
(52) U.S. Cl. ......................................... 381/314; 381/60
(58) Field of Search ................................. 381/312, 314, 381/320, 321, 60; 395/900

(56) References Cited

U.S. PATENT DOCUMENTS

| | | | |
|---|---|---|---|
| 4,972,487 A | | 11/1990 | Mangold et al. |
| 5,218,440 A | | 6/1993 | Mathur .................. 358/213.27 |
| 5,282,261 A | | 1/1994 | Skeirik ......................... 395/22 |
| 5,604,812 A | * | 2/1997 | Meyer ....................... 381/68.2 |
| 5,606,620 A | | 2/1997 | Weinfurtner ............... 381/68.2 |
| 5,636,285 A | * | 6/1997 | Sauer ........................ 381/68.2 |

FOREIGN PATENT DOCUMENTS

EP   0 712 261 A   5/1996

OTHER PUBLICATIONS

James M. Kates; On the feasibility of using neural nets to derive hearing–aid prescriptive procedures; (Accoustical Society of America, Jul. 1995, pp. 172–180.).

Arntsen, Koren and Strom; Hearing–aid Pre–selection through a Neural Network; Dec. 6, 1995 (Scand Audiol, pp. 259–262).

J. Haubold, A–life® 9000–individual optimization of hearing systems taking into account the acoustic environment (GEERS Hearing Instruments, Dortmund, 5 pages, no date).

Copy of Search Report received in counterpart PCT/US98/21701 dated Mar. 30, 1999.

M. Leisenberg: "Hearing Aids For The Profoundly Deaf Based On Neural Net Speech Processing", vol. 5, May 9, 1995, pp. 3535–3538, XP000937950 USA * the whole document.

* cited by examiner

Primary Examiner—Sinh Tran
(74) Attorney, Agent, or Firm—Welsh & Katz, Ltd.

(57) ABSTRACT

A neurofuzzy device is described that provides a fuzzy logic based user-machine interface for optimal fitting of programmable hearing prosthesis using a neural network that generates targets to be matched by the hearing prosthesis based on individual audiometric and other relevant data to the specific impairment and on the neural network accumulated learning from previous successful fittings. The incorporated learning process can occur on or off line and implements fitting rationales that can satisfy the needs of a general or specific clientele. The parameters of the programmable prosthetic device are set as a group in order to achieve optimal matching to the targets. The user-machine interface realized by a fuzzy logic system deciphers the commends/responses of the user while listening to various stimuli and modifies the targets accordingly thus, providing a closed loop system for in-situ interactive fitting.

7 Claims, 4 Drawing Sheets

NEUROFUZZY BASED DEVICE FOR PROGRAMMABLE HEARING AIDS

This application is a continuation-in-part of Provisional Application Ser. No. 60/062,354, filed Oct. 15, 1997, and entitled "A Neurofuzzy Methodology For Intelligent Hearing Prosthetics", upon which priority is claimed.

FIELD OF THE INVENTION

The present invention is directed towards fitting a programmable hearing aid by providing electroacoustic targets based on hearing impairments, on the learned information from previous successful fittings and on user comments/responses while listening to different sound environments and those targets are to be matched by the response of the hearing aid.

BACKGROUND OF THE INVENTION

Programmable hearing aids offer the possibility of making choices for the values of multiple parameters, hence allowing for a very wide range of electroacoustic responses capable of accommodating many different kinds of hearing impairments. The audiologist/hearing aid practitioner using audiometric measurements decides on the objectives/targets that the hearing device should match in order to compensate for the impairment.

With the advent of programmable hearing instruments, it has become possible to achieve near optimal matching between the electroacoustic responses and the targets. The targets are derived from prescriptive procedures, based on theoretical or empirical considerations, originally proposed for linear nonprogrammable hearing devices. Lately, new prescriptive formulas intended for nonlinear programmable devices such as DSLi/o are being used. Nevertheless, their targets are based on artificial listening environments (i.e., speech weighted noise) and do not adequately characterize hearing aid performance in realistic environments.

The audiologist is then often faced with user complaints that reflect the performance of the device in everyday environments and he/she then must adjust the operating parameters of the device with suboptimal tools and methods. Setting those parameters one at a time (e.g., AGC for the low channel, Gain for the high channel) is a suboptimal procedure because there is a great degree of interdependence between the parameters. Furthermore, the user responses and complaints are imprecise and uncertain and they need to be deciphered by the audiologist.

Finally, even tools that allow for an automatic mechanism for deciphering the user responses, such as the fuzzy logic device described in U.S. Pat. No. 5,606,620, are not optimal because they directly control the individual parameters of the device. Because of this direct control, many contradictory demands on setting the parameters are not adequately resolved by the inherent capabilities of the fuzzy logic. Furthermore, the said system does not provide for an efficient mechanism for incorporating learning from successful fittings other than the manual entry of fuzzy rules.

SUMMARY OF THE INVENTION

The invention provides for a neurofuzzy device that as a first step in the fitting process, generates initial targets for compensating a particular hearing loss. These targets are based both on collected individualized audiometric and other data and on the accumulated learning from previous successful fittings. Starting the fitting process with efficient initial targets could significantly shorten the process.

Targets could have the form of gain curves for different input levels, signal to noise curves, etc. These curves are not directly dependent on the particular hearing device used, rather they represent the electroacoustic response of an "ideal" prosthesis for the particular impairment.

The targets are generated by a multilayer neural network which is a "black box" information processing system trained to generate an optimum match between a set of audiometric measurements such as the auditory thresholds and the corresponding best frequency and gain curves at different input levels for each subject. The neural network requires a priori knowledge and acquiring it requires large amounts of data in order to converge to a solution.

The required a priori knowledge is entered into the network during an off line training session performed during manufacturing using data collected from hearing aid dispensing outlets from selected geographical areas. The currently available prescriptive rationales such as NAL are based on such data and are used in fitting traditional non programmable hearing aids as well as starting frequency/gain target curves for programmable devices.

The known rationales are fairly limited in scope as it is not possible to develop formulas based on observations of large fitting data that will adequately reflect the interdependencies in the data. A neural network can far more effectively capture the essential nonlinearities of the problem. The captured knowledge is in the form of nodal weights in the hidden layers of the network.

Training the network is also an ongoing process which is enabled after the fine tuning process that culminated in a successful fitting. The modified targets, resulting from the fuzzy logic based fine tuning process described later on, are used for retraining the neural network. Such on-line training allows for the neurofuzzy fitting device to be biased toward the peculiarities of a particular clientele.

The fine-tuning process in this neurofuzzy methodology closes the loop of the fitting process. After the initial targets are generated, the settings of all the parameters of the hearing prosthesis are derived and transmitted to the hearing aid. The user is then asked to listen to different sound stimuli (e.g., speech at different levels, speech and noise at different signal to noise ratio etc.) and rate the performance of the hearing aid using qualities of sound perception such as loudness, tonality, comfort, distortion, clarity etc. The fuzzy interface modifies the targets taking as inputs the user response as well as certain objective characteristics of the sound stimuli (e.g., overall sound pressure level and signal to noise Ratio) and using preentered rules.

The preentered fuzzy rules could be provided by the manufacturer or locally by the audiologist. The new modified targets are used for the derivation of a new set of values, for all the parameters, which in turn are downloaded to the hearing aid. A new battery of tests is completed and the circle is repeated until satisfactory results are achieved.

The hearing aid parameters are a function of both the sound characteristics of the input to the hearing aid and the target curves (which, at the limit, are identical to the electroacoustic response of the hearing aid). This relationship can be encoded in a neural network by pretraining it using the targets and the sound characteristics as inputs and the corresponding parameters as outputs. At the end of the fitting process, and depending on the measure of satisfaction, the audiologist/hearing aid professional can use the final targets for the automatic retraining of the neural network that generates the initial targets.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
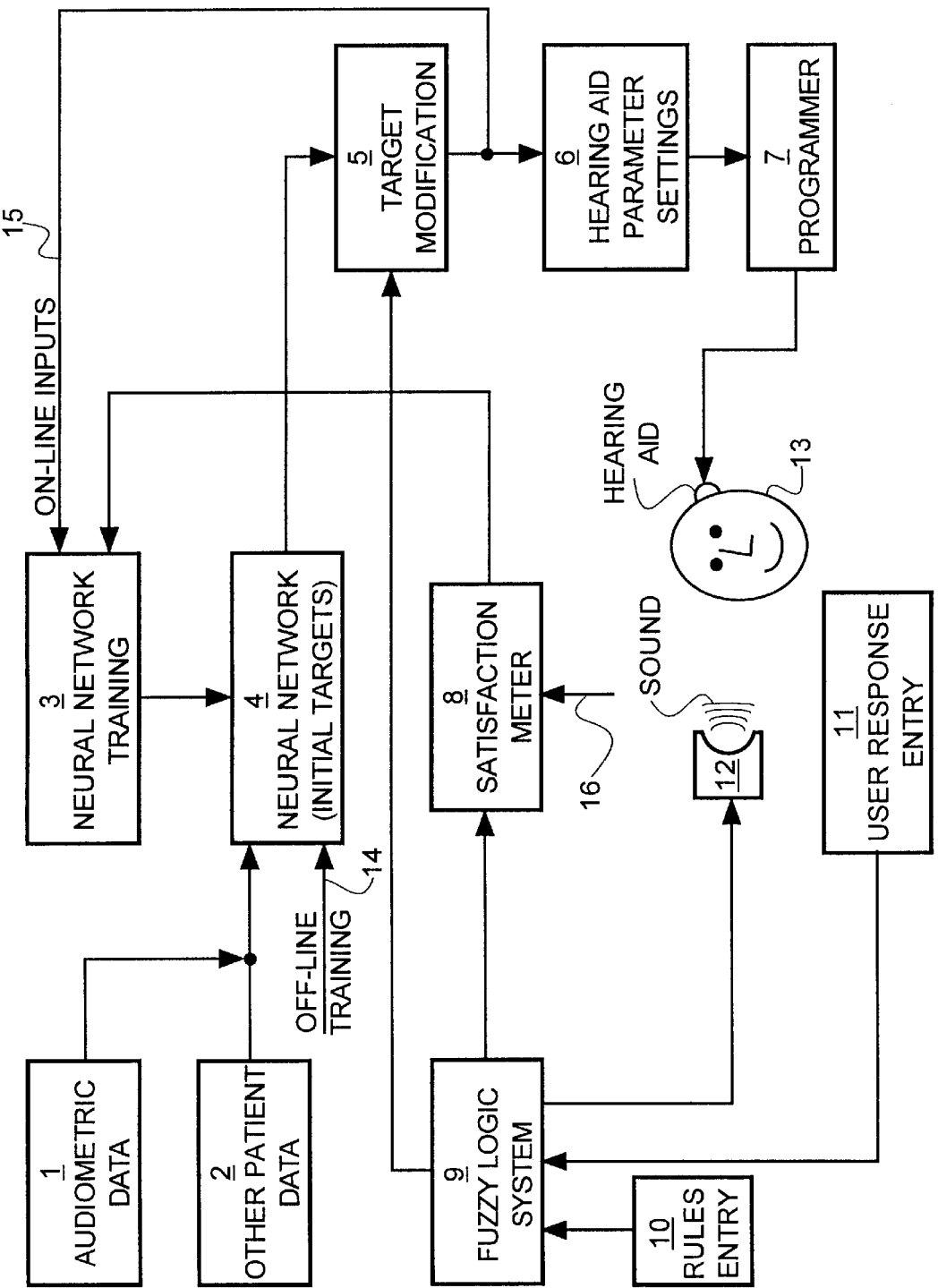
FIG. 1 is a block diagram of the device that implements the neurofuzzy methodology and the interaction points (data entry blocks) with the hearing impaired user and the audiologist.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

The device shown in FIG. 1 is a block diagram representation of the neurofuzzy system of the present invention used in optimizing the performance of a programmable hearing aid. This methodology can be realized on a personal computer with computer peripherals such the keyboard, the touch screen and the ports used as data entry and monitoring points and the sound card and the CD-ROM used for generating the sound signals used in the fine tuning process.

Figure 2:
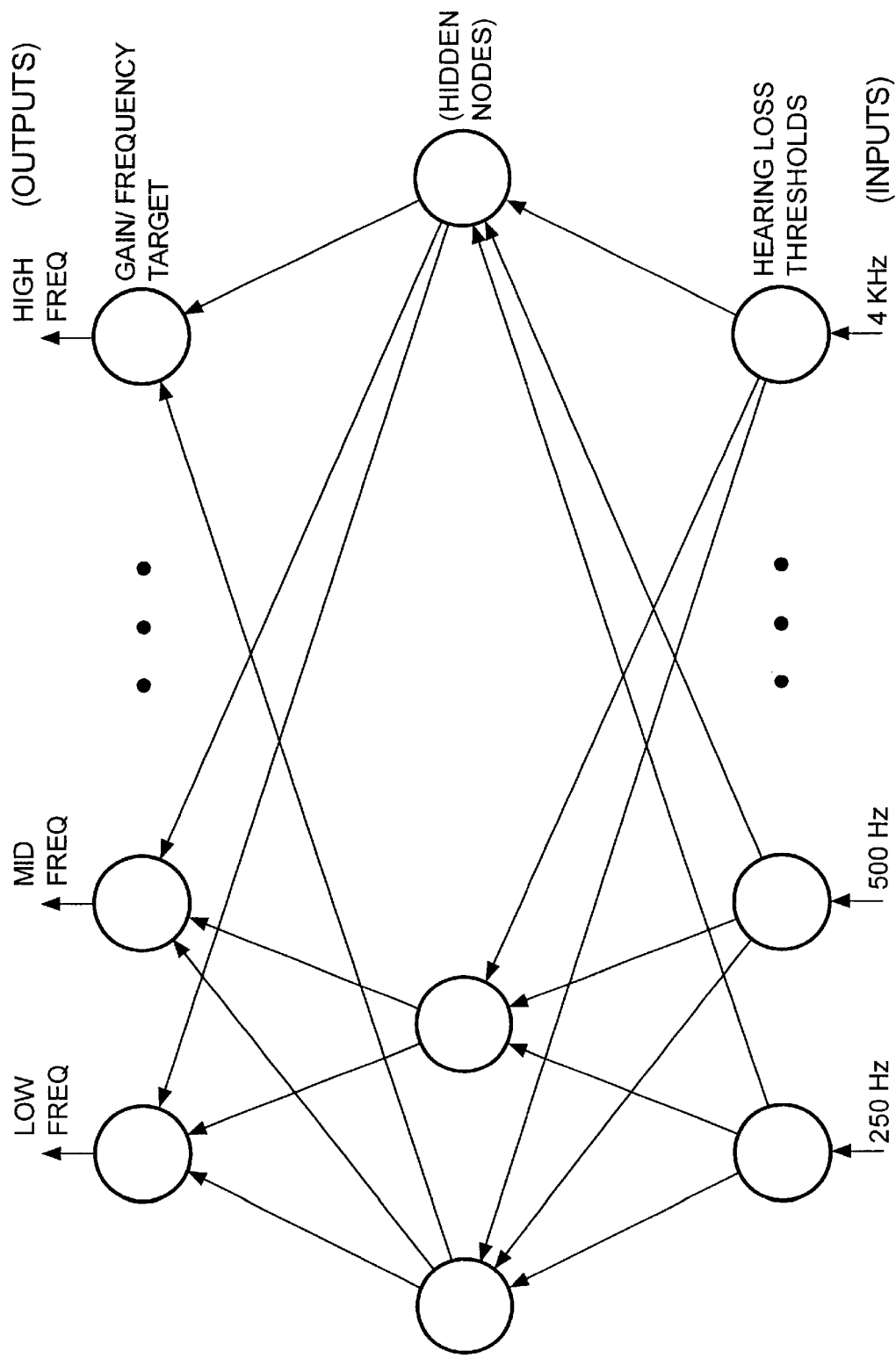
FIG. 2 is a diagram of a section of the neural network that generates gain target values for certain frequencies based on the hearing thresholds.

The blocks in FIG. 1 are separate subroutines in a software package provided to the audiologist by the hearing aid manufacturer. The audiometric data 1 is entered into the system via the computer keyboard and it includes, among others 2, audiometric threshold data at different frequencies. The above data is entered into a pretrained neural network 4 and a portion of this network is shown in FIG. 2.

Figure 3:
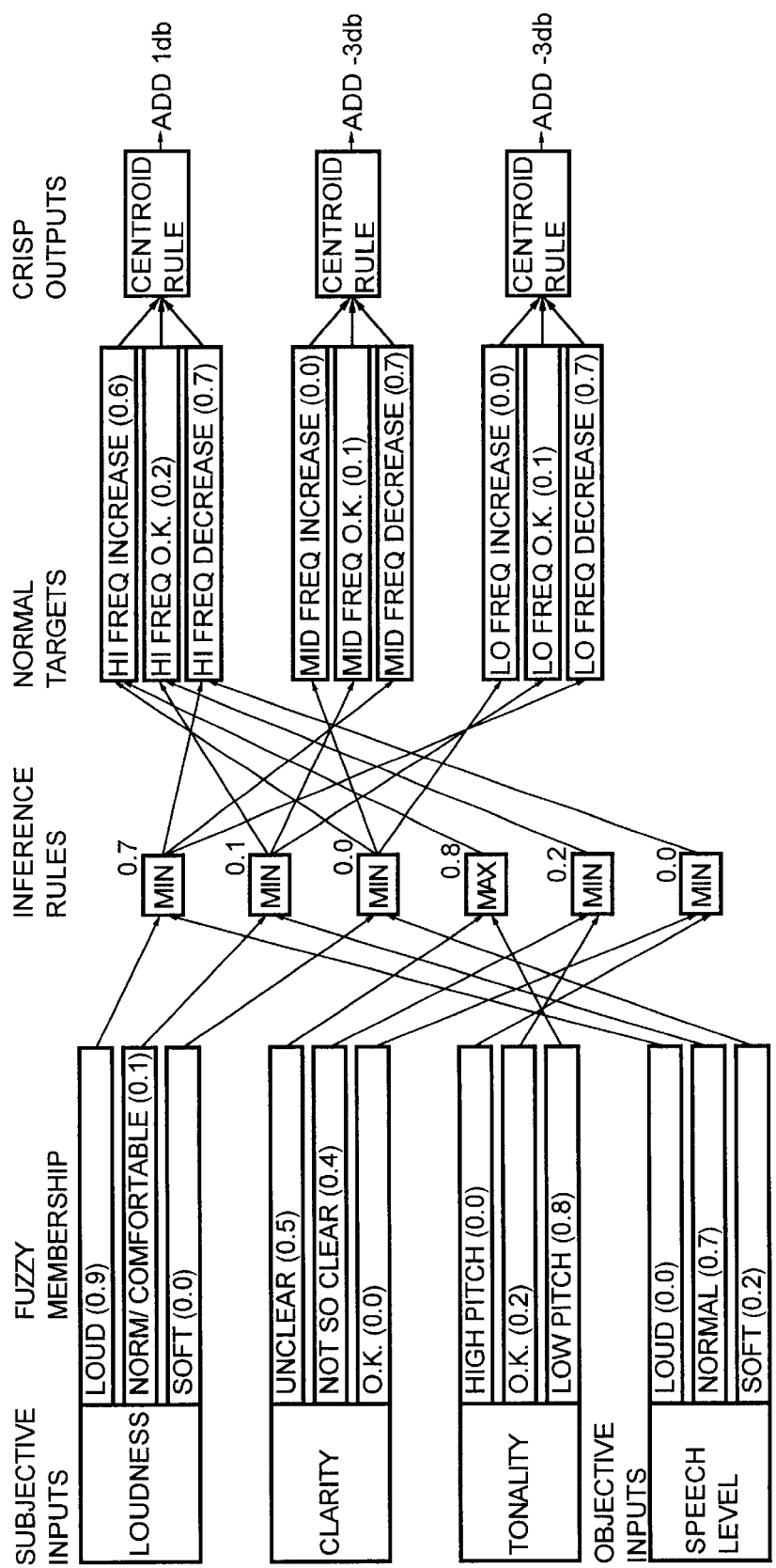
FIG. 3 is a "flow chart" representation of the fuzzy logic system that modifies the targets originally generated by the neural network. The fuzzy logic is part of the interactive fine tuning procedure of the hearing device.
Figure 3A:
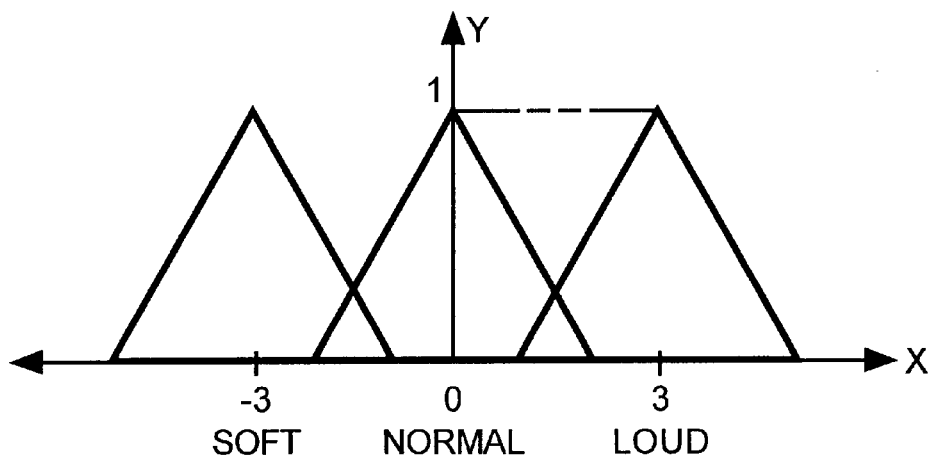
Figure 3B:
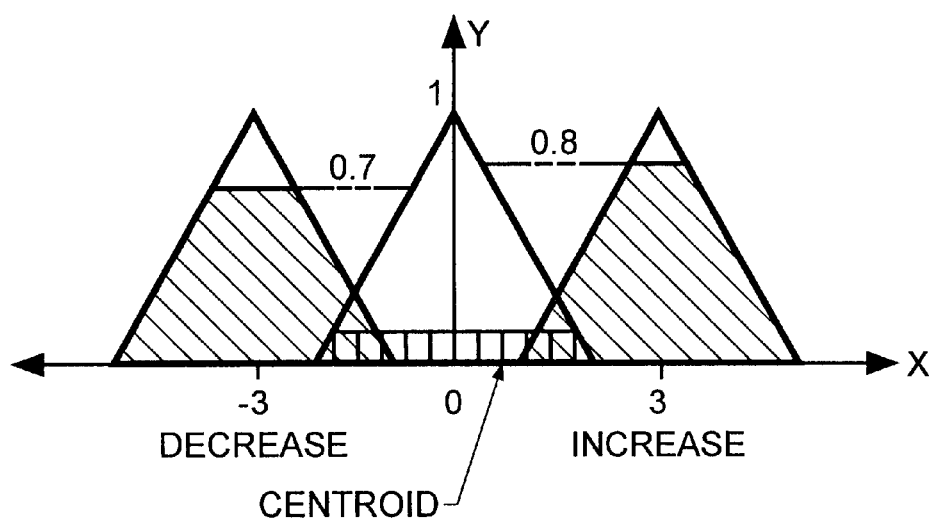

The network generates the necessary target values that the hearing aid needs to match the given input level in order to compensate for the impairment of that particular user. FIG. 3 gives an example of target values for three different frequency regions. Each of these values is a function of the user audiometric data (only thresholds are shown here for simplicity) and the information embedded in the hidden neural layers. This information is put there during the training session 3 of the neural network. Such training procedure is well known to those familiar with the field.

The training of the neural net 3 is done off line 14 before the device (software package) is sent for use to the audiologist. In the present configuration, retraining of the neural net is possible after a successful fitting.

When the level of satisfaction 8 of the performance of the hearing device is high enough, then retraining can take place by updating the embedded information in the hidden neurons of the neural net and using the set of modified targets 15 derived after a successful fine tuning process. Before retraining, the hidden neurons will produce an initial set of target curves based on the audiometric data 1 and other patient data 2.

After retraining, the future target curves will be closer to the ones resulting from the past successful fine tuning processes. Subsequently, for a user with similar audiometric data, the system will produce initial targets closer to the needs of this particular impairment, thus shortening the fine-tuning process.

Every time a new set of targets is generated 5, the parameters of the hearing aid must be changed in order for its electroacoustic response to match the targets. Generating the appropriate parameters 6 could take the form of pattern matching searches or, if computation time is a constraint, implementation with a pretrained neural network.

Once the parameters are generated they are sent to the hearing aid 13 via the programmer unit 7. The programmed hearing aid 13 is worn by the user and he/she is asked to evaluate its performance while listening to specific speech/sound stimuli 12. The user then quantitatively rates it in terms of certain sound qualities such as loudness, tonality, comfort, clarity, etc.

The user enters his/her responses 11 by entering a number on a scale via, for example, a touch screen monitor. An example of how these responses could be interpreted are described next. If the stimuli sounds loud to him/her, then a high number (3) is entered on the membership graph for loudness scale shown in FIG. 3.

The value of 3 on the x axis of said graph means that the sound level perceived by the user has a membership degree of 1 in the loud category and a membership degree of 0 in the soft and normal categories, as shown in the y axis of said graph. The membership degree numbers are the inputs to the fuzzy logic system 9.

In FIG. 3, a flow chart for purposes of enabling one of skill to understand and practice the invention, is shown of the fuzzy logic and its operation. The membership degrees in the objective input category termed speech-level in FIG. 3, indicate that the level of the input signal to the hearing aid is very close in value to what a normal hearing user calls comfortable (membership degree 0.7). That same signal is characterized as "loud" by the hearing aid user as indicated by the subjective input termed "loudness" (membership degree 0.9, in loud category). This same signal is characterized as "low pitch" (membership degree 0.8) in the tonality scale and "almost unclear" (membership degree 0.5) in the clarity scale.

Given the above evaluation, it is obvious that the hearing aid in this example is not performing well in restoring loudness and clarity to normal levels.

Certain adjustments to the initial targets are necessary. The necessary adjustments are described in the following examples of rules that the fuzzy logic system must implement.

1. If low pitch or unclear, then increase high frequencies.
2. If loudness is loud, and input is normal, then decrease low, mid, and high frequencies.
3. If high pitch and clear, then decrease high frequencies.
4. If loudness is normal and input is normal, then high, mid, and low frequencies are O.K.
5. If pitch is O.K. and clarity is O.K., then high frequency O.K.
6. If loudness is soft and input is normal, then increase high, mid, and low frequencies.

The implementation of the above examples of rules is illustrated in FIG. 2. The outcome of the implementation of the rules will be an increase, decrease or no change in the gain for the frequency/gain curve termed normal-target, corresponding to the target electroacoustic response of the hearing aid for normal level input sounds. The target curve is divided into low, mid, and high frequency sections for simplicity purposes. The gain of each of these sections can be increased, decreased, or remain unchanged, depending on the membership degree value assigned to it by the above inference rules.

Rule #1 assigns the minimum of two membership degree values (that of the loud category in the loudness scale, and the comfortable category in the speech level scale) to the increase-high-frequency category of the normal-target-high-frequency scale. The resulting membership degree is 0.8. The same procedure is followed with the rest of the rules.

If more than one membership degree is assigned to each category, the one with the maximum value is selected. After implementing all the rules, and based on the membership degree of the three frequency scales, it is clear that the gain in low and mid frequencies should be decreased and the gain for the high frequency should remain almost unchanged. The amount of necessary change in gain is derived by a rule such as the center-of-gravity rule shown in the membership graph for the high-frequency target.

The shaded area under each category (increase, O.K., decrease) gives a visual representation of the membership degree. The center of gravity of the shaded area is closer to 3 than to −3 in the x axis (close to 1). The centroid is a representative crisp value which indicates how many decibels of gain must be added to the high frequency target. Thus, FIG. 3 indicates a crisp value of 3 dB should be subtracted from the mid and low frequency gain of the target curve.

When a battery of different listening tests and evaluations is completed using the new modified targets, the fine tuning procedure will continue until the audiologist decides that a satisfactory level of performance is reached. The satisfaction meter 8 can be based on the weighted accumulated changes of the target curves. Once a converging value is reached, this could be indication of having reached a point of diminishing returns in the fine tuning process.

Although modifications and changes may be suggested by those skilled in the art, it is the intention of the inventor to embody within the patent warranted hereon all changes and modifications as reasonably and properly come within the scope of his contribution for the generation and the adjustments to the initial targets as are necessary.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. An external programmer to be used with a separate programmable hearing aid, the external programmer comprising;
    circuitry including a neural network for generating a set of hearing aid response defining parameters addressing at least one aspect of a user's hearing impairment in at least one listening environment;
    circuitry, coupled to the network for entering audiological and other relevant data that characterize aspects of the impairment and of the user;
    a fuzzy logic processor incorporating rule generating commands for modifying the parameter set based on user-provided responses as a result of the user listening to pre-stored sound stimuli;
    circuitry for downloading the parameter set to the separate hearing aid;
    means for generating different prestored sound stimuli for the in situ evaluation of the performance of the hearing aid;
    means for receiving the user responses to be used by the fuzzy logic processor;
    means for the online retraining of the neural network after successful fittings;
    means for the off-line retraining of the neural network from data collected off-site after successful fittings; and
    means for entering fuzzy processing rules to said fuzzy logic processor.

2. An external programming device for use with a separate programmable hearing prosthesis that sets the operational characteristics of said prosthesis, said device comprising:
    audible output circuitry for generating different prestored sound stimuli for the in situ evaluation of the performance of the hearing prosthesis;
    input circuitry for receiving audiological and other relevant data that characterize aspects of the impairment and of the user, and user responses to the different sound stimuli;
    neural network circuitry for generating initial operational characteristic values, based upon at least one aspect of the hearing impairment and at least one listening environment;
    fuzzy logic circuitry incorporating rules generating commands for modifying said initial operational characteristic values based upon the user provided responses while listening to the different sound stimuli corresponding to the different sound environments;
    a data processor optimizing the full set of operational characteristics for the separate programmable hearing prosthesis as a group;
    coupling circuitry for downloading said operational characteristics to the separate hearing prosthesis;
    neural network retraining circuitry for retraining on-line the neural network after successful fittings, and for retraining off-line the neural network from data collected for successful off site fittings; and
    updating circuitry for updating the fuzzy processing rules of the fuzzy logic circuitry.

3. A fitting system for establishing a set of performance defining parameters for a separate, programmable hearing aid comprising:
    a programmable processor;
    neural network software, executable by the processor, for receiving patient information, including audiometric data and for implementing a neural network for producing a current set of parameters for the hearing aid;
    circuitry, coupled to the programmed processor, for downloading the parameters to and programming the hearing aid;
    circuitry for presenting pre-stored sound stimuli to the hearing aid for user evaluation of the performance of the hearing aid using the programmed parameters;
    fuzzy logic software for receiving user feedback of the pre-stored sound stimuli and for modifying the current set of parameters forming an updated set of parameters that are downloaded to the hearing aid.

4. A fitting system as in claim 3 which includes additional fuzzy logic software, responsive to received user feedback, for training of the neural network software in response to the user feedback.

5. A fitting system as in claim 3 which includes circuitry for retrieving the pre-stored sound stimuli to be presented to the user.

6. A fitting system for programming a separate hearing aid comprising:

software executable by a processor for implementing neural network processing of user audiological data to produce a set of parameters for a predetermined programmable hearing aid;

circuitry for coupling the set of parameters to a programmable hearing aid to specify the performance thereof;

second software, executable by the processor for presenting pre-stored audio stimuli to the hearing aid circuitry for receipt of real-time feedback from the hearing aid user relative to the presented pre-stored audio stimuli;

third software executable by the processor for implementing fuzzy logic processing for responding to the user feedback to modify the parameters; and software for downloading the modified parameters to the hearing aid thereby altering the characteristics thereof.

7. A fitting system as in claim 6 which includes software for modifying the neural network processing in response to the modifications made to the parameters.

* * * * *